United States Patent [19]

Steffens, Jr.

[11] Patent Number: 5,257,818
[45] Date of Patent: Nov. 2, 1993

[54] APPARATUS FOR RAPIDLY CHANGING THE TEMPERATURE OF A DEVICE IN AN INFLATABLE RESTRAINT SYSTEM

[75] Inventor: Charles E. Steffens, Jr., Washington, Mich.

[73] Assignee: TRW Vehicle Safety Systems Inc., Lyndhurst, Ohio

[21] Appl. No.: 941,976

[22] Filed: Sep. 8, 1992

[51] Int. Cl.⁵ ............................................. B60R 21/26
[52] U.S. Cl. ................................... 280/736; 280/741
[58] Field of Search ............... 280/741, 728, 742, 735, 280/736, 728 R

[56] References Cited

U.S. PATENT DOCUMENTS

| | | | |
|---|---|---|---|
| 3,884,500 | 5/1974 | Wagner | 280/741 |
| 4,026,580 | 5/1977 | Wulf et al. | 280/742 |
| 4,134,540 | 1/1979 | Lagher | 236/34.5 |
| 4,310,174 | 1/1982 | Sundeen et al. | 280/735 |
| 4,394,033 | 7/1983 | Goetz et al. | 280/736 |

Primary Examiner—Margaret A. Focarino
Assistant Examiner—Paul Dickson
Attorney, Agent, or Firm—Tarolli, Sundheim & Covell

[57] ABSTRACT

An inflatable occupant restraint system is located in a vehicle having a mechanism, such as a heater or an air conditioner, for controlling the temperature in the occupant compartment of the vehicle. The system comprises an inflatable air bag and an actuatable inflator for providing gas to inflate the air bag. The inflatable air bag, when inflated, protects an occupant of the vehicle. A duct directs air from the temperature controlling mechanism to the inflator to change the temperature of the inflator rapidly.

6 Claims, 1 Drawing Sheet

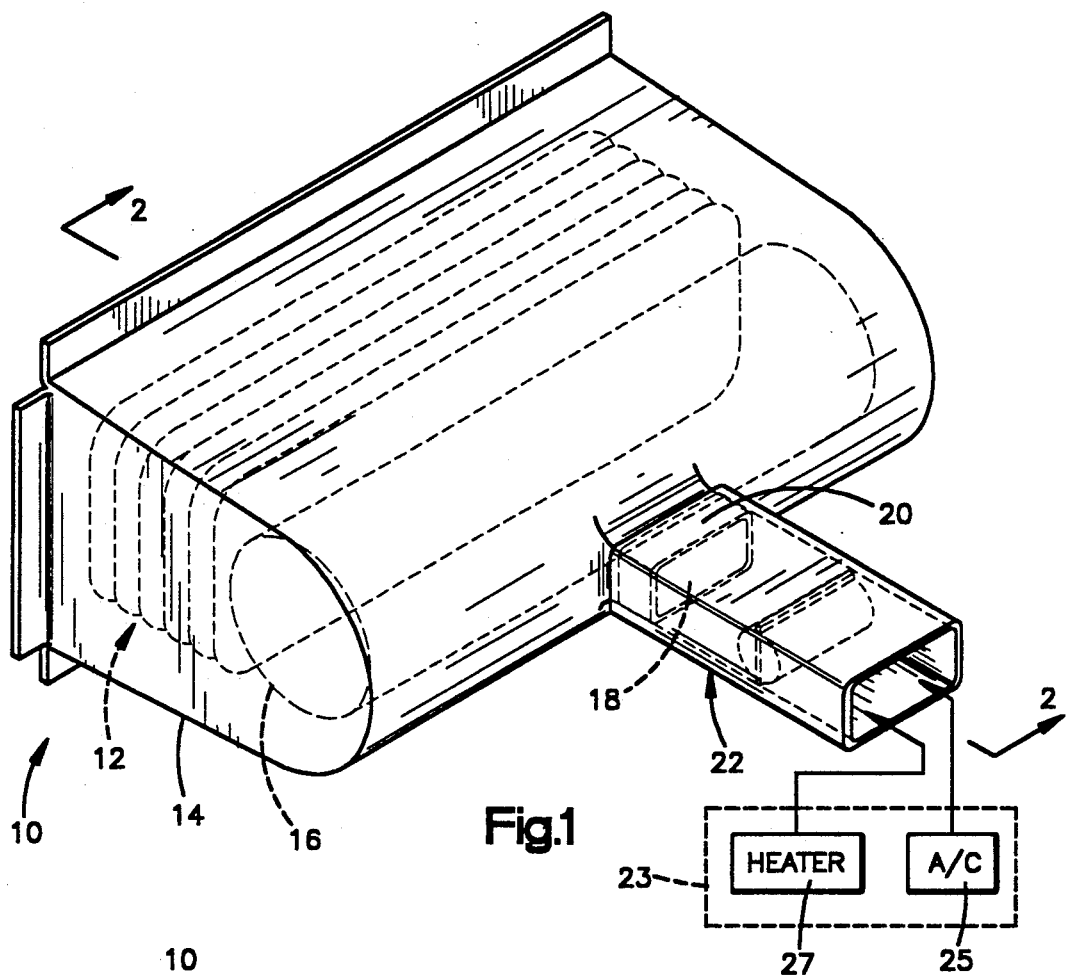
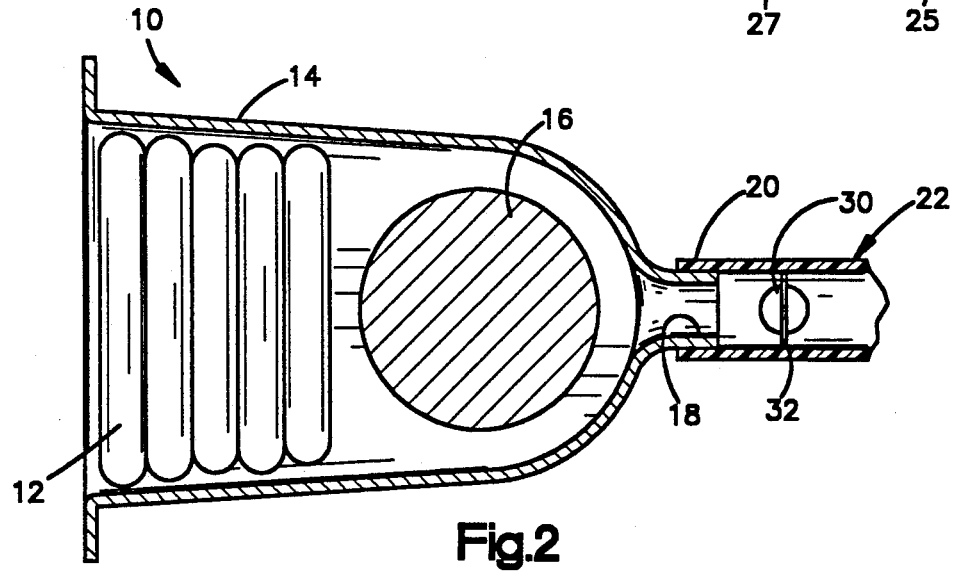

APPARATUS FOR RAPIDLY CHANGING THE TEMPERATURE OF A DEVICE IN AN INFLATABLE RESTRAINT SYSTEM

BACKGROUND OF THE INVENTION

1. Technical Field

The present invention relates to an air bag system including an inflatable air bag for, when inflated, restraining a vehicle occupant upon the occurrence of a collision. The present invention is particularly directed to a structure for rapidly changing the temperature of a source of gas such as an inflator for inflating an air bag.

2. Background Art

Inflators for providing gas to inflate an air bag of an air bag system are well known. An inflator is typically designed to operate over a wide ambient temperature range. Although the inflator is designed to operate over a wide ambient temperature range, the inflator performs optimally within a narrow temperature range.

Performance degradation of known inflators increases when the temperature of the inflator is outside of the narrow temperature range. For example, if an inflator is at an extremely high temperature above the narrow temperature range, some gas from the inflator must be released to relieve the increased pressure within the inflator. In contrast, if the inflator is at an extremely low temperature below the narrow temperature range, not enough gas may be provided to inflate the air bag properly.

An inflator may be at an extreme temperature when the vehicle in which the inflator is mounted is initially started. If this is the case, it is desirable to minimize the amount of time the inflator is at the extreme temperature to minimize the time period of potential performance degradation.

SUMMARY OF THE INVENTION

In accordance with the present invention, an inflatable occupant restraint system is mounted in a vehicle having a mechanism, such as a heater or an air conditioner, for controlling the temperature in the occupant compartment of the vehicle. The inflatable occupant restraint system comprises an inflatable air bag for, when inflated, protecting an occupant of the vehicle. The inflatable occupant restraint system also comprises an actuatable inflator for, when actuated, providing gas to inflate the air bag. Means is provided for directing air to the inflator from the mechanism, such as a heater or an air conditioner, for controlling the temperature in the occupant compartment of the vehicle. Directing air from the temperature controlling mechanism rapidly changes the temperature of the inflator.

The inflator is located in a module assembly having an opening through which the air directed from the mechanism, such as a heater or air conditioner, flows to the inflator. The means for directing air includes a duct connected between the mechanism and the opening in the module assembly. The inflatable occupant restraint system further comprises blocking means including a blocking member. The blocking member is movable between a nonblocking position and a blocking position. In the nonblocking position, air directed from the temperature controlling mechanism by the means for directing air is allowed to reach the inflator. In the blocking position, air directed from the temperature controlling mechanism by the means for directing air is prevented from reaching the inflator.

The inflatable occupant restraint system further comprises sensing means for sensing the temperature of the air directed to the inflator and for providing a signal indicative of that temperature. Preferably, the sensing means includes a bimetallic spring. The bimetallic spring acts to move the blocking member to the blocking position when the signal of the sensing means indicates that the temperature of the air directed to the inflator is between a first predetermined temperature and a second predetermined temperature higher than the first predetermined temperature. The bimetallic spring acts to move the blocking member to the nonblocking position when the signal of the sensing means indicates that the temperature of the air directed to the inflator is either below the first predetermined temperature or above the second predetermined temperature.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a perspective view of an inflatable restraint system embodying the present invention; and FIG. 2 is a sectional view taken approximately along line 2—2 of FIG. 1.

DESCRIPTION OF A PREFERRED EMBODIMENT

The present invention is directed to a structure for rapidly changing the temperature of an inflator for inflating an air bag of an air bag system in a vehicle. The specific construction of the present invention may vary. As representative of the present invention, FIG. 1 illustrates an inflatable occupant restraint system 10.

The inflatable occupant restraint system 10 includes a folded inflatable air bag 12 located in a module assembly 14. The air bag 12 inflates in response to an impact against the vehicle. The air bag 12, when inflated, protects an occupant of the vehicle, as is known. An actuatable inflator 16 is also located in the module assembly 14. The inflator 16 actuates in response to a signal from an impact sensor (not shown) indicative of an impact against the vehicle. The module assembly 14 is mounted to the vehicle at a location and in an orientation which provide for proper deployment of the air bag 12 in the event of an impact against the vehicle. An opening 18 is located in a portion of the module assembly 14 adjacent the inflator 16, as shown in FIG. 1.

One end 20 of a duct 22 is sealingly connected to the module assembly 14 at the opening 18. The other end (not shown) of the duct 22 is operatively connected to a mechanism 23 for controlling the temperature in the occupant compartment of the vehicle. The mechanism 23 may be a heating, venting, and air conditioning unit (HVAC unit). The HVAC unit 23 includes an air conditioner 25 and a heater 27. The duct 22 directs cool air from the HVAC unit 23 to the space in the module assembly 14 around the inflator 16 when the air conditioner 25 of the HVAC unit 23 is turned on. Similarly, the duct 22 directs warm air from the HVAC unit 23 to the space in the module assembly 14 around the inflator 16 when the heater 27 of the HVAC unit 23 is turned on.

Referring to FIG. 2, a bimetallic sensor 30 is located inside the duct 22. The sensor 30 is operatively connected to a flap 32 which is pivotable between a closed position shown in FIG. 2 and an open position (not shown). When the flap 32 is in its closed position, air from the HVAC unit 23 is blocked and prevented from reaching the space in the module assembly 14 around the inflator 16. When the flap 32 is in its open position, air from the HVAC unit 23 is not blocked and is allowed to reach the space in the module assembly 14 around the inflator 16.

It is expected that the air conditioner 25 of the HVAC unit 23 will be turned on when the temperature in the occupant compartment of the vehicle is relatively high. Likewise, it is expected that the heater 27 of the HVAC unit 23 will be turned on when the temperature in the occupant compartment of the vehicle is relatively cool. Thus, the duct 22 directs cool air from the HVAC unit 23 to the space in the module assembly 14 around the inflator 16 when the temperature in the occupant compartment is relatively high. The duct 22 directs warm air from HVAC unit 23 to the space in the module assembly 14 around the inflator 16 when the temperature in the occupant compartment is relatively cool.

As is known, performance of the inflator 16 may degrade if the temperature of the inflator 16 is at an extreme end of a temperature range. More specifically, ignited propellant in the inflator 16 may not generate gas at or heat gas to a high enough pressure to inflate the air bag 12 in response to a signal from the impact sensor if the temperature of the inflator 16 is too low. Also, excess pressure may build up in the inflator 16 if the temperature of the inflator 16 is too high. It is desirable, therefore, to raise the ambient temperature of the air around the inflator 16 rapidly to warm the inflator 16 when the temperature of the inflator 16 is low. Similarly, it is desirable to lower the ambient temperature of the air around the inflator 16 rapidly to cool the inflator 16 when the temperature of the inflator 16 is high.

If the ambient temperature in the occupant compartment of the vehicle is at an extreme end of the temperature range when the vehicle is initially started, the temperature of the air around the inflator 16 is also likely to be at this extreme end of the temperature range. It is expected that the heater 27 of the HVAC unit 23 will be turned on when the vehicle is started if the ambient temperature in the occupant compartment is at the extreme low end of the temperature range. Likewise, it is expected that the air conditioner 25 of the HVAC unit 23 will be turned on when the vehicle is started if the ambient temperature in the occupant compartment of the vehicle is at the extreme high end of the temperature range. Thus, when the vehicle is initially started, warm air is directed to the space in the module assembly 14 around the inflator 16 to warm the inflator 16 if the temperature in the occupant compartment is at the extreme low end of the temperature range. Cool air is directed to the space in the module assembly 14 around the inflator 16 to cool the inflator 16 if the temperature in the occupant compartment is at the extreme high end of the temperature range.

If when the vehicle is started, warm air is directed to the space in the module assembly 14 around the inflator 16 to warm the inflator 16, the temperature of the inflator 16 is rapidly raised. Similarly, if when the vehicle is started, cool air is directed to the space in the module assembly 14 around the inflator 16 to cool the inflator 16, the temperature of the inflator 16 is rapidly lowered.

By raising or lowering the temperature of the inflator 16, as the case may be, optimal performance of the inflator 16 is rapidly ensured from the time the vehicle is started.

From the above description of the invention, those skilled in the art to which the present invention relates will perceive improvements, changes and modifications. Such improvements, changes and modifications are intended to be covered by the appended claims.

Having described the invention, the following is claimed:

1. An inflatable occupant restraint system for mounting in a vehicle having a mechanism for controlling the temperature in the occupant compartment of the vehicle, said system comprising:
   an inflatable air bag for, when inflated, protecting an occupant of the vehicle;
   an actuatable inflator for, when actuated, providing gas to inflate said air bag;
   means for directing air from the mechanism to said inflator to change the temperature of said inflator rapidly;
   a sensing means for sensing temperature of the air directed to said inflator and for providing a signal indicative of said temperature of the air directed to said inflator, said sensing means being located in said means for directing air;
   a blocking means including a blocking member movable between a nonblocking position in which the air directed from said mechanism by said means for directing is allowed to reach said inflator and a blocking position in which the air directed from said mechanism by said means for directing is prevented from reaching said inflator; and
   wherein said sensing means includes a bimetallic spring which acts (i) to move said blocking member to the blocking position when said signal of said sensing means indicates that the temperature of the air directed to said inflator is between a first predetermined temperature and a second predetermined temperature higher than said first predetermined temperature, and (ii) to move said blocking member to the nonblocking position when said signal of said sensing means indicates that the temperature of the air directed to said inflator is either below said first predetermined temperature or above said second predetermined temperature.

2. The system of claim 1 further comprising a module assembly in which said inflator is located, said module assembly having an opening through which the air directed from the mechanism flows to said inflator.

3. The system of claim 2 wherein said means for directing air includes a duct connected between said mechanism and the opening in said module assembly.

4. The system of claim 1 wherein said mechanism for controlling the temperature in the occupant compartment of the vehicle is a heating and air conditioning mechanism, said mechanism directs cool air from said mechanism to said inflator when said air conditioner of said mechanism is turned on and said mechanism directs warm air from said mechanism to said inflator when said heater of said mechanism is turned on.

5. An inflatable occupant restraint system for mounting in a vehicle having a heating and air conditioning mechanism for controlling the temperature in the occupant compartment of the vehicle, said system comprising:

an inflatable air bag for, when inflated, protecting an occupant of the vehicle;

an actuatable inflator for, when actuated, providing gas to inflate said air bag; and means for directing air from the heating and air conditioning mechanism to said inflator to change the temperature of said inflator rapidly, said means directs cool air from said mechanism to said inflator when said air conditioner of said mechanism is turned on and said means directs warm air from said mechanism to said inflator when said heater of said mechanism is turned on.

6. The system of claim 5 further comprising a sensing means for sensing temperature of the air directed to said inflator and for providing a signal indicative of said temperature of the air directed to said inflator, said sensing means being located in said means for directing air, a blocking means including a blocking member movable between a nonblocking position in which the air directed from said mechanism by said means for directing is allowed to reach said inflator and a blocking position in which the air directed from said mechanism by said means for directing is prevented from reaching said inflator; and wherein said sensing means includes a bimetallic spring which acts (i) to move said blocking member to the blocking position when said signal of said sensing means indicates that the temperature of the air directed to said inflator is between a first predetermined temperature and a second predetermined temperature higher than said first predetermined temperature, and (ii) to move said blocking member to the nonblocking position when said signal of said sensing means indicates that the temperature of the air directed to said inflator is either below said first predetermined temperature or above said second predetermined temperature.

* * * * *